Oct. 30, 1962 H. H. WALLER 3,061,671

RETRACE SIGNAL ELIMINATOR

Filed Nov. 16, 1959

INVENTOR
HERBERT H. WALLER
BY
Mitchell & Bechert
ATTORNEYS

United States Patent Office 3,061,671
Patented Oct. 30, 1962

3,061,671
RETRACE SIGNAL ELIMINATOR

Herbert H. Waller, Hicksville, N.Y., assignor to Servo Corporation of America, New Hyde Park, N.Y., a corporation of New York Filed Nov. 16, 1959, Ser. No. 853,132
6 Claims. (Cl. 178—7.1)

Figure 1:
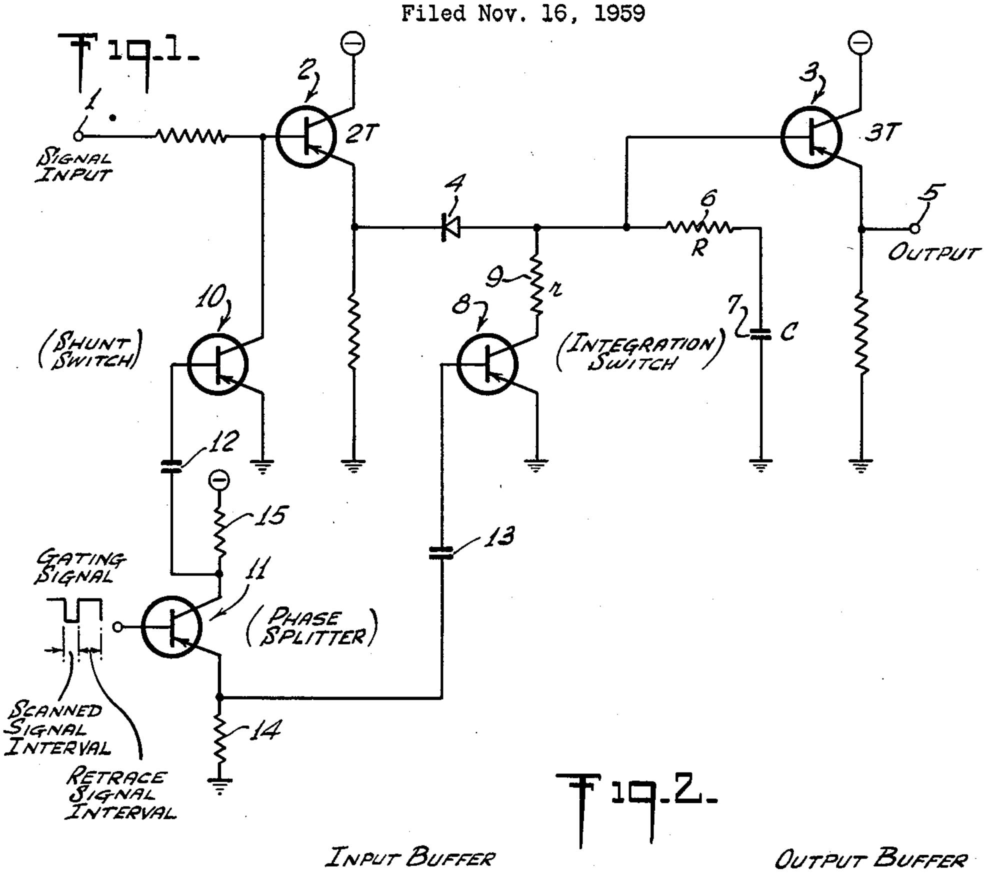

This invention relates to a scanning system in which video and retrace signals are produced, and more particularly to a novel circuit for eliminating retrace signals and substituting therefor a signal equal to the average of the preceding video signals.

In certain types of scanning systems, a continuously rotating scanner is mounted in a housing which has an opening positioned over the area or target to be scanned. In these systems, the scanner scans the target area during a part of each revolution and "looks" at the interior of the housing during the remaining portion of the revolution. For purposes of explanation, the time while the scanner is scanning the target area will be termed "the scanning interval" and the time while the scanner is "looking" at the interior of the housing will be termed "the retrace interval." The signals received during the scanning interval will be termed "video signal."

In systems of the above character, wherein the scanner employs detecting elements which are sensitive to white light, the amplitude of the output signals from the scanner during the retrace interval usually is very low as compared to the amplitude of the signals received during the scanning interval. This relationship of signal amplitudes occurs because the housing normally is darker than the scanned target area. In these instances the waveform of the output signals comprises negative square waves or pedestals separated by video signals.

In scanners employing infrared elements which are sensitive to temperature variations, the output signals contain either positive or negative pedestals, dependent upon whether the temperature of the housing is higher or lower than the amplitude of the infrared radiations received from the target area.

The composite output signals, video plus retrace, from the scanner, whether generated by light-sensitive elements or infrared-sensitive elements, are normally amplified and then transmitted to receiving equipment, wherein information received during the scanning interval is utilized. Since the output signals generally include an extremely high or low retrace pedestal signal as compared to the average level of video signals, an amplifier having a relatively wide dynamic amplification range is required. This type of amplifier generally is encumbered by inherent disadvantages, such as distortion, low signal-to-noise ratio, etc.

Accordingly, it is a primary object of the invention to provide a novel circuit for eliminating the pedestal and substituting therefor a signal equal to the average of the preceding video signals.

It is a feature of the invention to provide a pedestal signal eliminator which is independent of the relative duration of the retrace interval and the scanning interval.

In accordance with an aspect of the invention, the circuit for substituting the "average" video signal for the pedestal comprises an input circuit adapted to receive video and retrace signals, an output circuit and an integrating circuit coupled between the input and output circuits. The invention is characterized by selectively operable means for charging the integrating circuit only during the occurrence of the video signal and additional selectively operable means for shunting the retrace signals prior to the integration circuit and applying the output of the integrating circuit to the output circuit only during the occurrence of the retrace signals.

Figure 2:
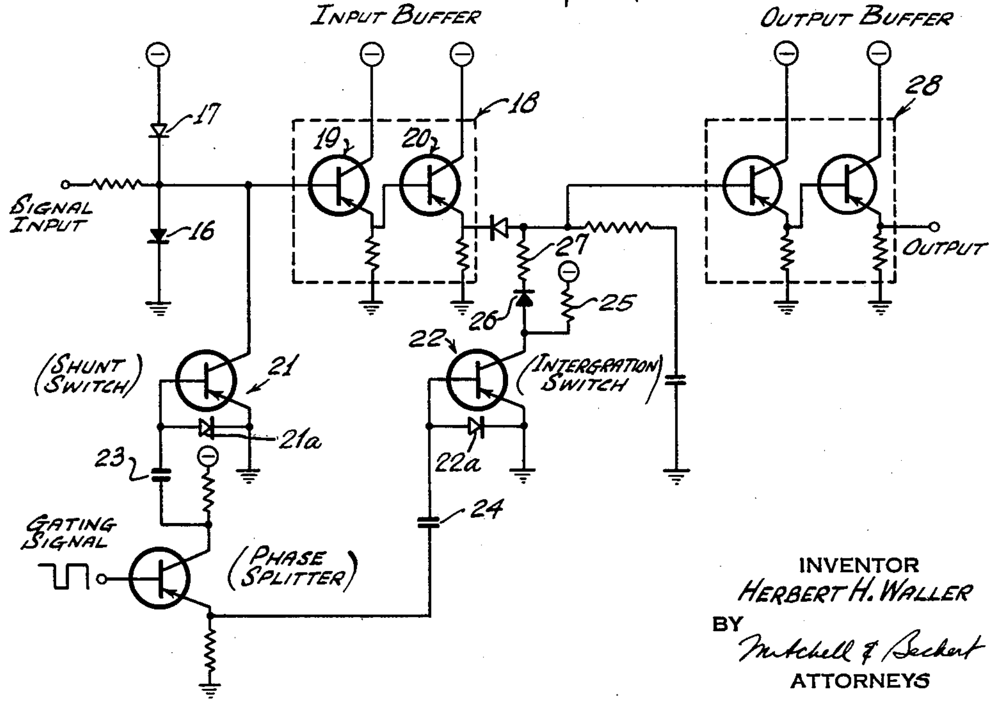

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 is a simplified schematic diagram of the novel pedestal signal eliminator; and FIG. 2 is a more detailed and practical schematic diagram of the circuit of FIG. 1.

Since the scanning system per se forms no part of the present invention, it has not been shown.

Referring now to the drawing, the video and retrace signals produced by the scanning system are applied to a signal input terminal 1. The input termianl 1 constitutes the input to an amplifier 2; the amplifier 2 being coupled to an output amplifier 3 over a coupling diode 4 poled to pass the signals in a predetermined direction from the input amplifier to the output amplifier.

In the preferred embodiment, the amplifiers comprise PNP type transistors connected in the common collector configuration and in accordance with standard practice, the emitter electrode is shown with the arrowhead. As is well known, the PNP transistor conducts when a voltage negative to the emitter is applied to the base electrode; the collector electrode being biased negatively relative to the base.

For purposes of illustration, it will be assumed that the scanning system is of the infrared type and the retrace and video signals are of the same polarity, but the retrace signal being of much greater amplitude.

The video and retrace signals are negative when applied to the signal input terminal 1. Assuming the first signal is a video signal, it is applied to the base electrode of transistor 2T, causing the transistor to conduct. A replica of the signal appears at the emitter electrode, which is passed by the coupling diode 4 and applied to the base electrode of transistor 3T. The signal being negative causes transistor 3T to conduct and a replica of the signal is taken at the output terminal 5.

The next signal in time applied to the input terminal 1 is the pedestal or retrace signal. The invention is characterized by shunting the retrace signal and substituting therefore a signal equal to the average of the preceding signals.

This is accomplished by an integration circuit consisting of a resistor 6 and a capacitor 7 coupled across the output amplifier 3. That is, one terminal of the resistor 6 is connected to the junction of the diode 4 and base electrode of the transistor 3T and the remote terminal of the capacitor 7 is coupled to ground, as is the emitter electrode of the transistor 3T. The integration circuit is under control of a gating circuit comprising a transistor 8 of the PNP type and a resistor 9 of lesser resistance than the resistor 6. The gating circuit is coupled across the integration circuit, whereby when transistor 8 is conducting, the voltage across resistor 9, which fluctuates in accordance with the waveform of the input signal, is integrated in the integration circuit. During the occurrence of the video signal, the gating circuit is closed by causing the transistor 8 to conduct.

A second gating circuit, comprising a transistor 10, of the PNP type, is coupled between the base electrode of transistor 2T and ground. This gating circuit is closed during the occurrence of the retrace signal, whereby the retrace signal is shunted away from the integration circuit.

The gating circuits serving as an "integration circuit switch" and a "shunting switch," as indicated in FIG. 1, are controlled by a phase splitter comprising a transistor 11, also of the PNP type. The collector electrode is coupled over blocking capacitor 12 to the base electrode of transistor 10 and the emitter electrode is coupled over blocking capacitor 13 to transistor 8. While transistor 11 is conducting, a negative potential is developed across resistor 14 in its emitter circuit and applied to the base electrode of transistor 8, thereby causing transistor 8 to conduct and effectively close the gate controlling the integration circuit. Meanwhile, a positive potential is developed across the collector circuit resistor 15 of transistor 11 and applied to the base of transistor 10, thereby preventing the transistor from conducting and effectively opening the gate, which when closed serves to shunt the applied signals to ground. Conversely, when transistor 11 is cut off, transistor 10 is rendered conducting and transistor 8 is blocked.

The operation of transistor 11 is controlled by a gating signal having the illustrated waveform. Since in the conventional rotary scanning type system the retrace period occupies approximately two-thirds of the total period, the retrace gating signal is approximately twice as long as the scanning gating signal. The gating signal is synchronized with the applied signals so that the retrace signal interval corresponds to the occurrence of the retrace signal and the scanned signal interval corresponds to the time of the scanned signal. Since the retrace gating signal is positive, it serves to cut off transistor 11, thereby causing transistor 10 to conduct and shunt the retrace signal to ground. Meanwhile, the transistor 8 is blocked and the average video signal accumulated on the integrating capacitor is applied to transistor 3T through resistor 6. The coupling diode 4 is poled to block the discharging current from passing therethrough and the transistor 8, being cut off, also serves to restrict the direction of discharge into the transistor 3T. The rate of discharge caused by transistor 3T is made sufficiently small to cause but an insignificant change in the signal on capacitor 7 during the retrace interval. Thus, the signal presented to transistor 3T and in turn presented by transistor 3T to the output 5 is essentially constant during the retrace period.

It is now apparent that the integration circuit consisting of resistor 6 and capacitor 7 is switched by means of the diode 4 as a series switching element. The selective switching mechanism permits integration of a signal only while the integration switch is closed and the shunt switch is opened. The integrating circuit finds and maintains the average level of the signal level completely independent of the intervening time interval in which the shunt switch is closed and the integrating switch opened.

FIG. 2 illustrates a preferred practical circuit diagram of the invention. In the input section of the circuit, it is advisable to employ a positive limiter 16 and a negative limiter 17 to prevent excessive signal peaking from damaging the input buffer 18 comprising two transistors 19, 20 in cathode-follower connection.

The two transistors 19, 20 in cascade offer high input impedance to prevent loading of the video signal.

The shunt switch 21 and integrating switch 22 are provided with equalizing diodes **21*a* and 22*a* respectively. The diodes 21*a*, 22*a* equalize the charge and discharge path of coupling capacitors 23 and 24** and thus prevent clamping.

The integration switch in the practical embodiment is refined from the simplified embodiment comprising merely a transistor. The refined switch additionally comprises a resistor 25 connected to the negative supply and a diode 26 in series with resistor 27 (corresponding to resistor 9). In the configuration of FIG. 2, switching is accomplished by the diode 26 rather than by the transistor. Under certain conditions where the ambient temperature is high, the integrating switch is capable of being switched into non-conduction even though the transistor itself is slightly conductive as a result of thermal migration.

The output buffer 28 is arranged to offer very high impedance to prevent discharging the integration capacitor during the retrace interval.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. In a scanning system wherein video and retrace signals are produced, a circuit for eliminating the retrace signals and substituting therefor a signal equal to the average of the preceding video signals, said circuit comprising an input amplifier circuit, an output amplifier circuit, a coupling diode coupled between said input and output amplifier circuits poled to pass current in a predetermined direction from said input to said output amplifiers, a resistance-capacity integration circuit coupled to the output of said diode and the input of said output amplifier, means whereby said integration circuit is charged by current flowing in said predetermined direction, the direction of discharge of said integration circuit toward said input amplifier circuit being blocked by said poled diode, whereby during the occurrence of video signals said integration circuit is being charged, and means for shunting said retrace signals prior to said coupling diode.

2. The circuit according to claim 1, wherein said circuit comprises a first gating means coupled between said input amplifier and ground, whereby when said gating means is closed the signals are shunted to ground; and said means further comprising a second gating means coupled across said integration circuit and including a resistance relatively small compared to the resistance of said integration circuit, said integration circuit and said second gating means having one terminal connected to ground, whereby when said second gating means is closed the video signal fluctuations thereacross are averaged in said integration circuit, and gate control means including means synchronized with the scanning video and retrace signals for opening said first gating means and closing said second gating means during the presence of said video signal, and alternating the condition of said gating means during the presence of said retrace signal.

3. The circuit according to claim 2, having generating means to provide a source of gating signals corresponding in time to said video and retrace signals, gate control means responsive to said signals from said generating means including a phase splitter having a pair of output terminals for supplying voltages of opposite polarity and coupled to said first and second gating means respectively, whereby the wave form of said gating signals produces output signals from said phase splitter to open said first gating means and close said second gating means during the occurrence of said video signals and during the occurrence of said retrace signal, the output of said phase splitter closes said first gating means and opens said second gating means.

4. In a scanning system wherein video and retrace signals are produced consecutively, said signals having a predetermined period, input means having means for receiving said video and retrace signals including output circuit means, output means, integrating means coupled to the output circuit means of said input means and the input of said output means, selectively operable shunting means coupled to said input means operable during the period of said retrace signal to shunt said retrace signal and to control the application of the output of said integrating means to the said input of said output means coupled to said integrating means and control diode means for decoupling said integrating means from said input means during the period of said retrace signal.

5. In a scanning system wherein video and retrace signals are produced consecutively, said signals having a predetermined period, input means having means for receiving said video and retrace signals, output means, control means coupled to the input of said output means and the output of said input means to couple and decouple said input means from the output means, integrating means coupled to the output of said control means and the input of said output means, first gating means between the output of said integrating means and the input of said output means to allow the output of said integrating means to be applied to the input of said output means when open, second gating means including selectively operable shunting means coupled to said input means having means responsive to said retrace signal to operate said shunting means during the period of said retrace signal to shunt said retrace signal.

6. In a scanning system wherein video and retrace signals are produced consecutively, said signals having a predetermined period, input means having means for receiving said video and retrace signals, output means, control means coupled to the input of said output means and the output of said input means to couple and decouple said input means from the output means, integrating means coupled to the output of said input means and the input of said output means, first gating means between the output of said integrating means and the input of said output means to allow the output of said integrating means to be applied to the input of said output means when open, second gating means including selectively operable shunting means coupled to said input means having means responsive to said retrace signal to operate said shunting means during the period of said retrace signal to shunt said retrace signal, and gate control means to control the opening and closing of said first and second gating means for a time equal to the period of said retrace signal and at the time said retrace signal is impressed on said input means.

References Cited in the file of this patent

UNITED STATES PATENTS

| | | |
|---|---|---|
| 2,594,449 | Kircher | Apr. 29, 1952 |
| 2,792,496 | Rhodes | May 14, 1957 |

FOREIGN PATENTS

| | | |
|---|---|---|
| 661,807 | Great Britain | Nov. 28, 1951 |